Figure 1:
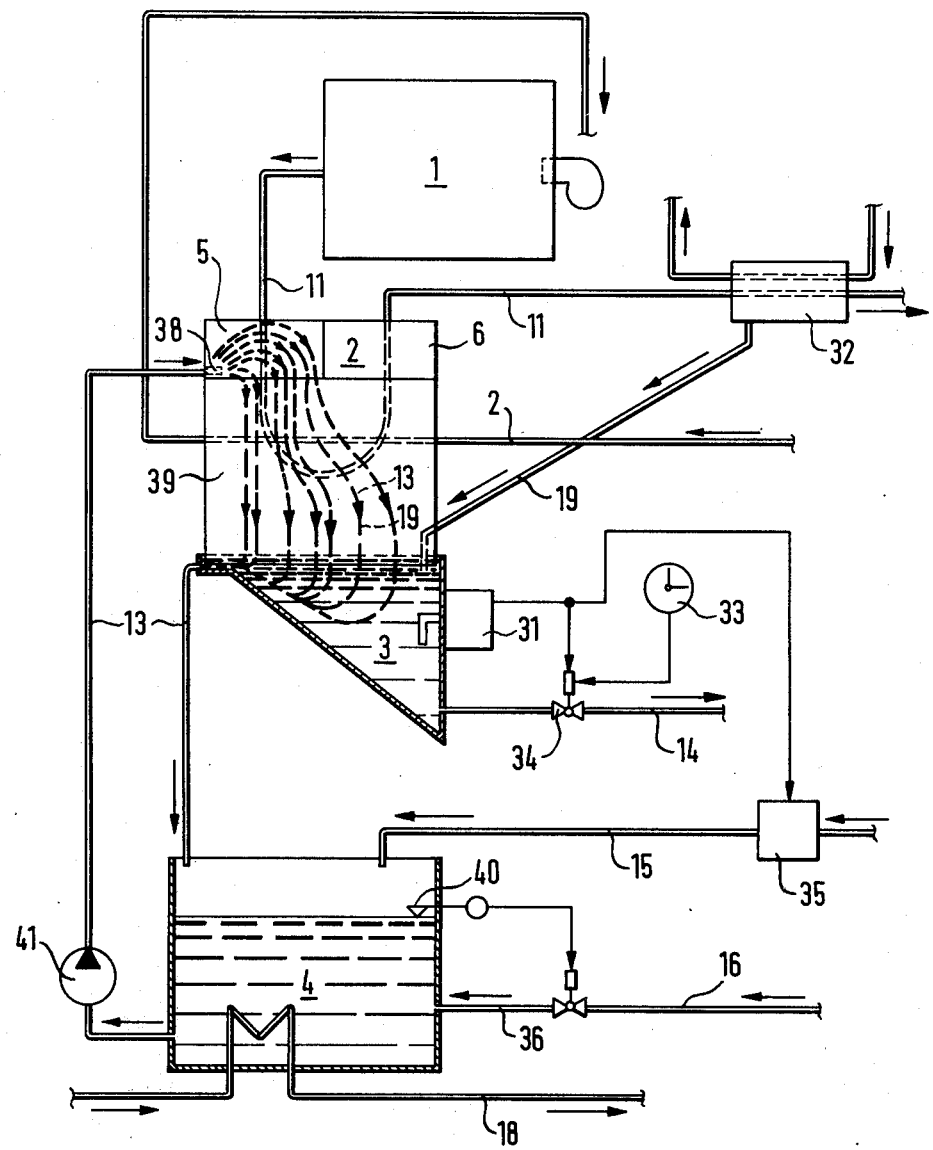

United States Patent [19]

Ritvanen

[11] 4,323,371
[45] Apr. 6, 1982

[54] METHOD AND ARRANGEMENT FOR TREATING GASEOUS COMBUSTION PRODUCTS

[75] Inventor: Tapio Ritvanen, Turku, Finland
[73] Assignee: Oy Wartsila Ab, Helsinki, Finland
[21] Appl. No.: 158,300
[22] Filed: Jun. 10, 1980

[30] Foreign Application Priority Data
Jun. 15, 1979 [FI] Finland ................................ 791914

[51] Int. Cl.³ ............................................ B01D 53/14
[52] U.S. Cl. .......................................... 55/19; 55/73;
55/222; 55/227; 55/228; 422/111; 422/173; 423/242
[58] Field of Search .................. 55/19, 73, 85, 89, 222, 55/227, 228, 257 R; 423/212, 242 R, 242 A; 422/111, 168, 173

[56] References Cited
U.S. PATENT DOCUMENTS

| | | | |
|---|---|---|---|
| 3,533,748 | 10/1970 | Finfer et al. | 423/242 X |
| 3,607,001 | 9/1971 | Finfer et al. | 423/242 A |
| 3,897,540 | 7/1975 | Onnen | 423/242 A |
| 3,907,526 | 9/1975 | Saleem et al. | 55/73 X |
| 4,147,756 | 4/1979 | Dahlstrom et al. | 55/73 X |
| 4,208,383 | 6/1980 | Kisters et al. | 423/242 X |
| 4,213,946 | 7/1980 | Furuta et al. | 423/242 |

Primary Examiner—Robert H. Spitzer
Attorney, Agent, or Firm—McAulay, Fields, Fisher, Goldstein & Nissen

[57] ABSTRACT

A method for treating gaseous combustion products, in particular, combustion products containing sulphur dioxide and smoke gases. The combustion products are led to a scrubber in which they are brought into contact with scrubbing water, into which a base, preferably calcium hydroxide, has been added for obtaining suitable neutralization of the acids created in the scrubber. The scrubbing water is sprayed into the gaseous combustion products, preferably in the form of a finely divided mist, and after the scrubbing operation the combustion products are led through a heat exchanger for cooling and for recovery of condensation water. The scrubbing water used and the condensation water are collected in a settling tank, at the bottom of which solid impurities are caused to settle for removal at suitable intervals. The purified surplus water is led from the settling tank and is reintroduced into the scrubber. The amount of base mixed into the scrubbing water for converting the acids created in the scrubber into settling salts, is so chosen, that the pH value of the liquid in the settling tank is 7-10, preferably 8-9.

11 Claims, 4 Drawing Figures

METHOD AND ARRANGEMENT FOR TREATING GASEOUS COMBUSTION PRODUCTS

The invention is related to a method for treating and scrubbing gaseous combustion products, as well as to an apparatus for applying the method.

Several methods are known for treating combustion products of engines, burner units etc. by such means, that nitrogen and sulphur compounds dangerous to the surroundings and polluting the surroundings, especially sulphur dioxide, and smoke gases are removed in sufficient amounts before releasing combustion products into the atmosphere. It is common to known methods, that acid is formed from said compounds, which is recovered by means of a concentration process. As a result, however, the process becomes rather complicated and the quality requirements for materials in the treating apparatus of combustion products are high, thereby considerably increasing the costs of the apparatus and of the operation.

An object of the invention is to provide a method for treating gaseous combustion products, with technically uncomplicated process and regulation, and which method does not impose high requirements for the treating apparatus. According to the invention this is accomplished in a way described in the claims. By means of the invention impurities in the combustion products being dangerous to the surroundings are simply and economically removed and brought to such a form, that they easily can be moved away e.g. through an ordinary sewage conduit.

A base to be mixed into the scrubbing water is with advantage mixed in a separate mixing container, into which the purified water also is led before renewed treatment. The control of the base feeding may favourably be based on pH values measured after scrubbing the combustion products, preferably from a settling tank for recovering used scrubbing water. By this means the composition of the scrubbing water can be regular such, that the pH values of the impurities to be removed do not differ, for example when feeding into a sewage conduit, from the permitted ones or other values chosen in advance.

The settling tank employed for recovering used scrubbing water can be placed directly under the scrubber unit and the heat exchanger so, that the level of the scrubbing water collected in said tank reaches up higher than the bottom of the heat exchanger thus forming a tight liquid seal at the bottom of the heat exchanger based on the so called odour seal principle. By this arrangement a simple and efficient construction is obtain.

The economy of the combustion products treatment can be improved by leading the combustion products further through a second heat exchanger for further recovering of heat energy. The condensation water produced hereby can, again, be led into said settling tank for renewed use in the treating process of the combustion products.

An object of the invention is also to provide an apparatus for the treatment of gaseous combustion products from a burner unit using oil, gas or a corresponding fuel, which apparatus comprises a scrubber unit of the combustion products and a mixing container for adding a base to the scrubbing water. The scrubber unit is provided with feed nozzles for scrubbing water fed from the mixing container, which nozzles bring scrubbing water into contact with the combustion products in the form of a finely divided mist. The apparatus is further provided with a heat exchanger, which preheats the combustion air of the burner unit by means of the combustion products, and with a bottom receptacle located below said heat exchanger for collecting the scrubbing water and the condensation water separated in the heat exchanger and for separating from the water solid impurities by means of settling, which water, after said operations, is arranged to be led into said mixing container for repeated use. By this means, in view of the treatment of the combustion products, an uncomplicated and efficient construction is obtain being advantageous also in the sense of energy economy.

Said bottom receptacle can with advantage be provided with means for determining the pH value of the scrubbing water used and for feeding, at intervals, the settled solid material out from the bottom receptacle. Thus the composition of the material to be removed can be checked before feeding away.

The mixing container for its part can be provided with means for feeding thereto a base as well as additional water needed in the process. Said feeding of the base can be arranged to be regulated in accordance with the pH values measured in said bottom receptacle.

The economy of the apparatus can be improved by providing it with a second heat exchanger, by means of which the heat energy of the scrubbed combustion products is recovered. The condensation water produced by this process can be arranged to be led to said receptacle for being reused in the treatment process. The bottom receptacle may be located below the heat exchanger of the scrubber unit so that the level of the scrubbing water received in the receptacle is above the level of the bottom of the heat exchanger, thus forming a tight liquid seal at the bottom of said heat exchanger.

Figure 2:
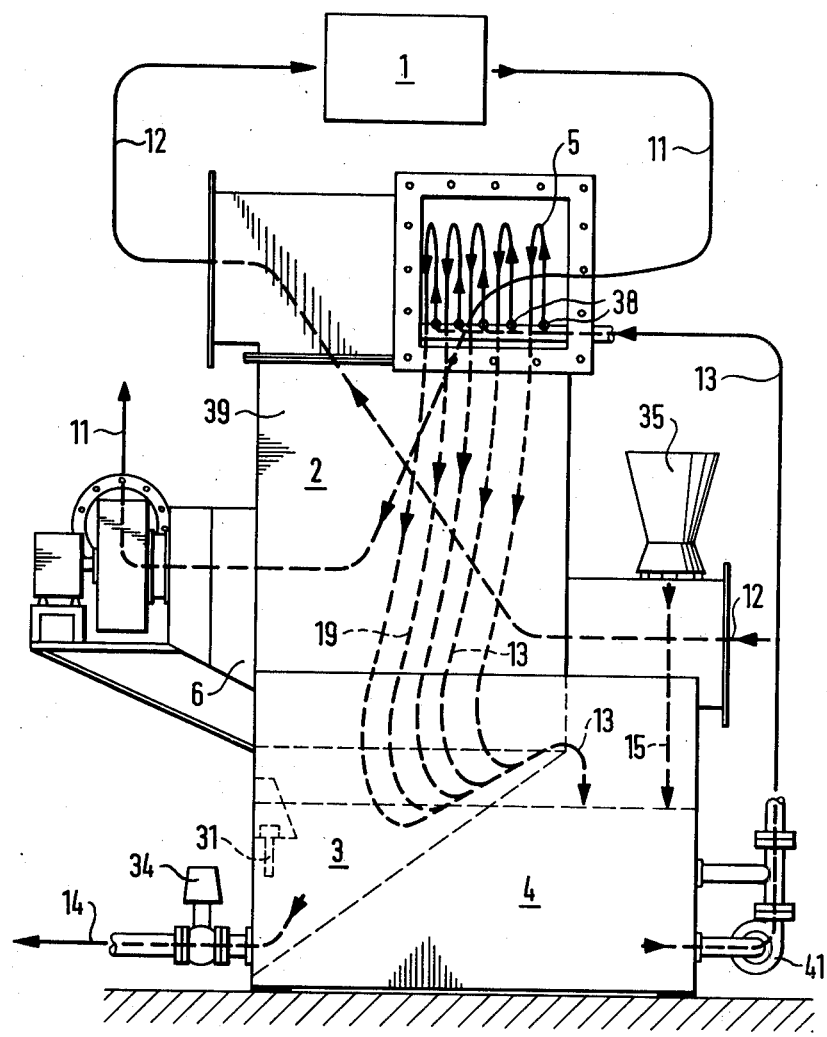
Figure 3:
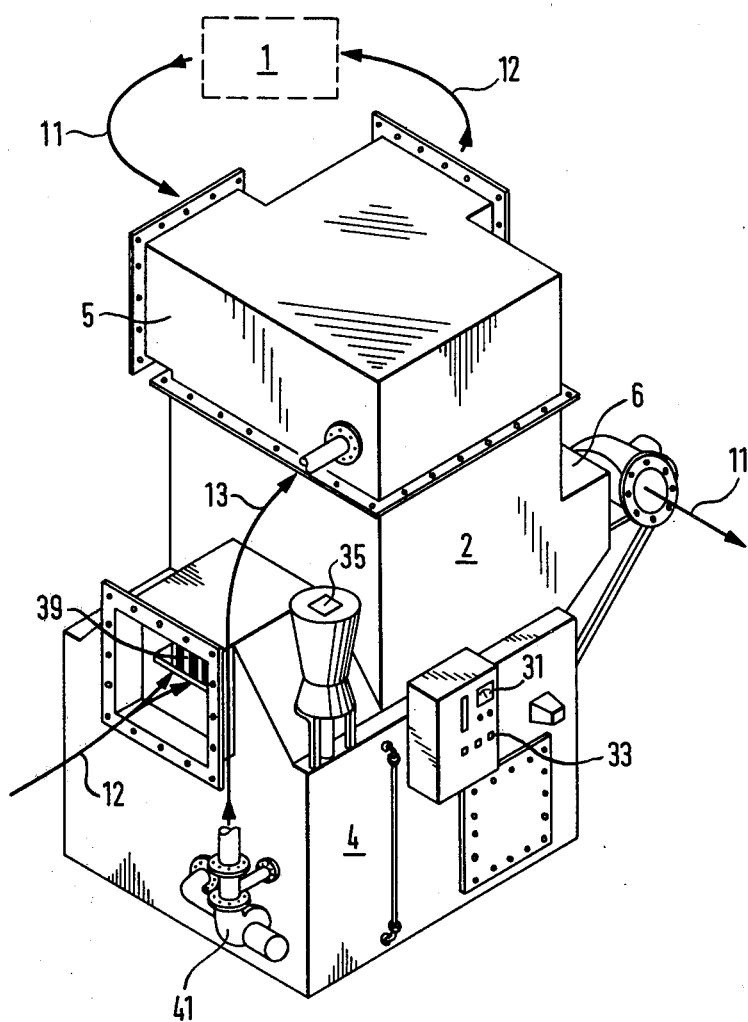
Figure 4:
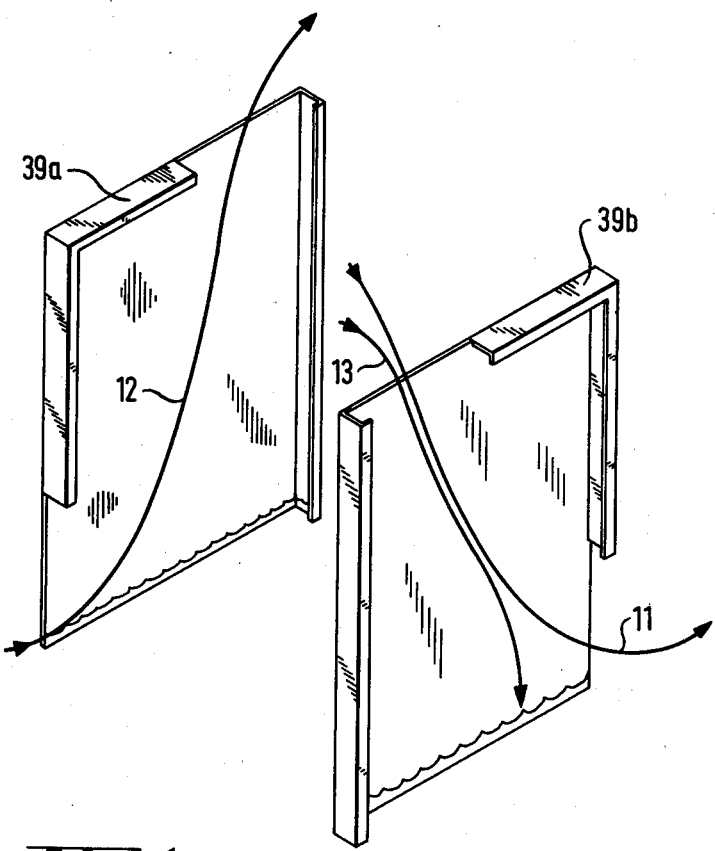
Figure 1:
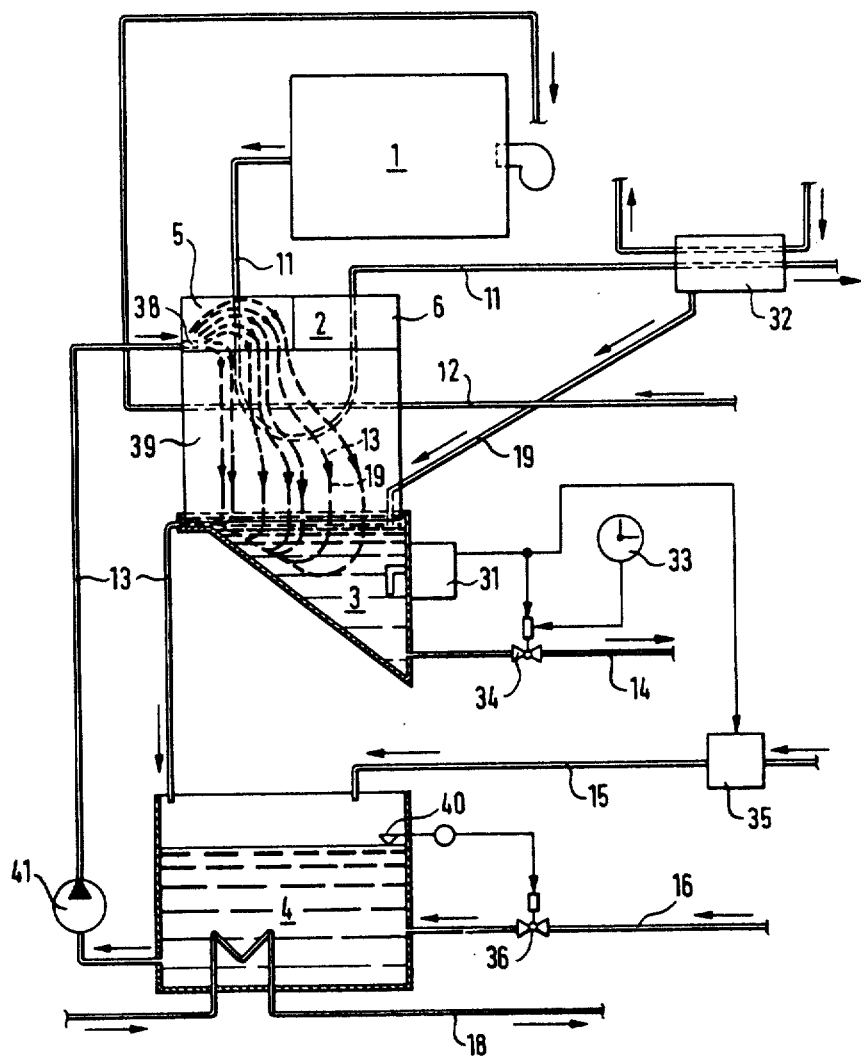

In the following, the invention is described more in detail, with reference to the attached drawing, in which FIG. 1 shows schematically an application of the method according to the invention, FIG. 2 shows a principle side view of an apparatus according to the invention, FIG. 3 shows the apparatus according to FIG. 2 as a perspective view, FIG. 4 shows heat exchanger plates used in the heat exchanger.

In the drawing the numeral 1 refers to a burner, a combustion engine or a similar unit producing combustion products including especially sulphur compounds and smoke gases. The reference numeral 2 indicates a scrubber unit, 3 a bottom receptacle, in which used scrubbing water is collected, and 4 a mixing container, in which a base is added to the scrubbing water before feeding it to the scrubber unit 2 by means of a pump 41 and nozzles 38.

Scrubber unit 2 is divided into a scrubber chamber 5 and a drop separation space 6 and a heat exchanger 39 connecting these two spaces. By means of the plates 39a and 39b of the heat exchanger the combustion products are led in one direction and cooling air is led in the other, which air is also used as combustion air in burner unit 1. Plates 39a and 39b are somewhat different in shape, as evident from FIG. 4, and they are arranged in the heat exchanger in alternate order, so that the combustion products and the cooling air passes at different sides of each plate. Directly below heat exchanger 39 bottom receptacle 3 is located and it is provided with a regulating unit 31 including a pH value measuring device and is further provided with an outlet tube 14 having a shut-off valve 34 operated by a control unit 33.

Mixing container 4 is connected to a base dosing unit 35 for feeding, for instance, lime or preferably calcium hydroxide, and further connected to a tube 16 for feeding additional water and provided with a shut-off valve 36. The mixing container is also provided with a liquid level sensor 40 controlling valve 36.

The arrows 11 show the flow path of the combustion products, the arrows 12 show the flow path of the cooling air of the scrubber unit, that is, also the flow path of the combustion air of burner 1, the arrows 13 show the scrubbing water circulation, the arrows 19 the flow path of the condensation water and the arrows 15 the base feeding.

The treatment of the combustion products of burner 1 is carried out in the following way. The combustion products are led to scrubber chamber 5 of scrubber unit 2 where alkalic scrubbing water is mixed with them through nozzles 38, preferably in the form of a mist as finely divided as possible. Thereafter, the scrubbing water and the combustion products are led between plates 39a and 39b of a heat exchanger unit, whereby water condenses at the surface of the plates and the combustion products are cooled. At the same time the combustion air of burner 1 led through heat exchanger 39 and working as a coolant, is pre-heated, which saves energy.

The scrubbing water passing heat exchanger 39 and the water condensing at plates 39a and 39b is collected in bottom receptacle 3, which is arranged below heat exchanger 39, so that its water level is above the bottom edge of plates 39a and 39b, thus forming a liquid seal at the bottom of the heat exchanger. Provided that the scrubbing water contains a suitable amount of base, it will neutralize the sulphuric acid being created by the sulphur compounds contained in the combustion gases, forming salts which settle together with other solid materials at the bottom of the bottom receptacle 3, from where they can be removed at suitable intervals through outlet tube 14. By means of a pH value measuring device it is checked that the material to be removed is neutral or slightly alkalic, that is, that it has a suitable pH value, so that it can be fed, for instance, into the sewer network.

The surplus water collected into bottom receptacle 3 is led to scrubbing water mixing container 4, in which the scrubbing water is mixed a suitable amount of base before it is reused in scrubber unit 2. The dosing of the base to be fed into the mixing container is regulated by control unit 31, so that the pH value of the material to be removed is kept between preset limit values. In other words, there has to be enough base for neutralizing the acids created at the scrubbing of the combustion gases. In order to obtain that the salts formed by neutralization of the acids, should settle, the pH value measured in the bottom receptacle should be 7–10, preferably 8–9. A base should be used forming easily settling salts, for instance, calcium hydroxide, as mentioned before. In order to prevent that the salt created would crystallize and form solid bodies in the bottom receptacle, also small amounts of other bases can be mixed into the scrubbing water, for intance, sodium hydroxide in order to obtain a suitable salt formation in the bottom receptacle. In case the material to be removed from the bottom receptacle does not meet the requirements as to the pH value, the opening of shut-off valve 34 of outlet tube 14 is governed by control unit 31 in accordance with the pH values measured, so that in such a case valve 34 will not open.

The scrubbed combustion products which have passed heat exchanger 39, are led to drop separating space 6, where their flow speed is slowed down, whereby a part of the humidity existing in form of drops flowing together with the combustion products will remain in the scrubber unit and is led from there to the bottom receptacle. Thereafter, the scrubbed combustion products can be led to still another heat exchanger 32 for further cooling and for further recovering of condensation water. The heat energy thereby recovered can naturally be used in many different ways according to the actual need, for instance, for drying, for pre-heating inlet air of an air conditioning system etc. Also part of the heat energy of the scrubbing water collected in mixing container 4 can be used, for instance, in a unit 18 for pre-heating service water. With all these measures it is possible to considerably improve the total thermal efficiency of the burner system.

The invention is not limited to the embodiments shown, but several modification thereof are feasible within the scope of the attached claims.

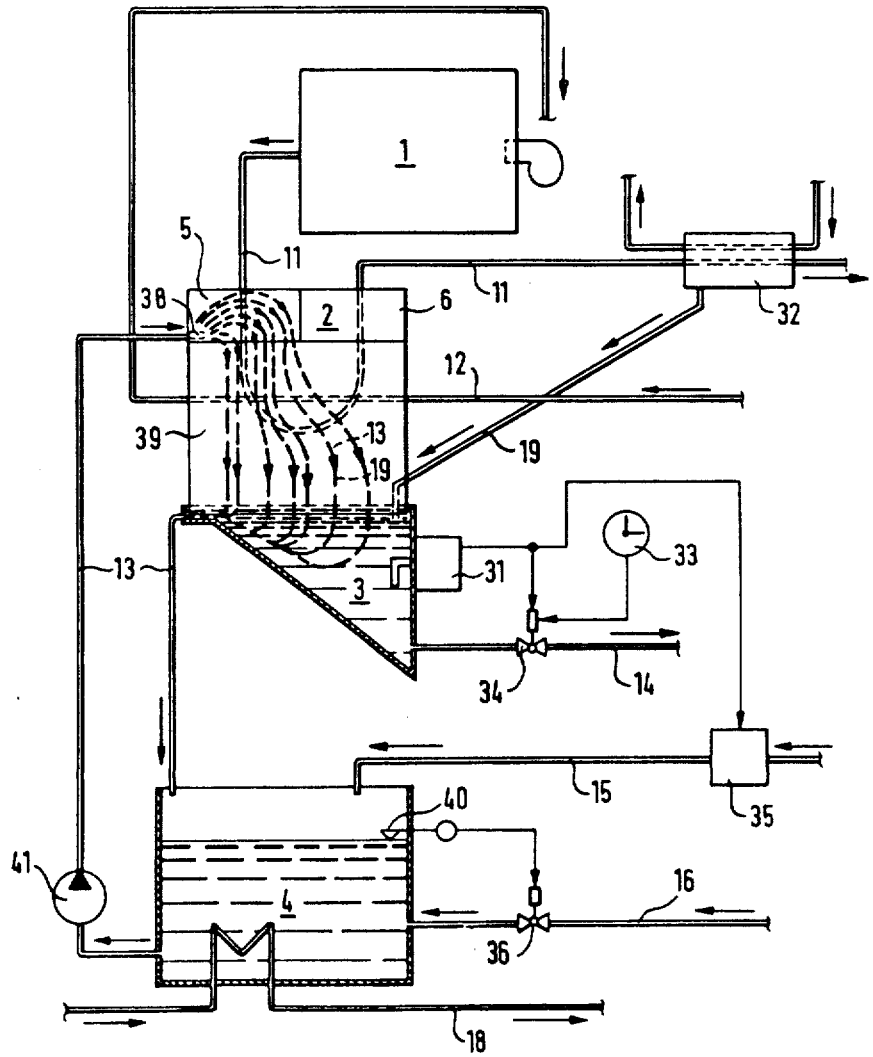

I claim:

1. A method for operating a plant for treating and scrubbing gaseous combustion products, in particular combustion products containing sulphur dioxide and smoke gases, in which the combustion products are lead to a scrubber unit where they are brought into contact with scrubbing water containing a base, preferably calcium hydroxide, for neutralization of acids contained in said scrubber unit, whereafter said combustion products are led through a heat exchanger for cooling and recovery of condensation water and the used scrubbing water and said condensation water are collected adjacent to said heat exchanger in a settling tank at the bottom of which solid impurities are caused to settle for removal at suitable intervals, said method including the steps of
   measuring the pH value of the mixture in said settling tank for obtaining a measuring value as close as possible to said scrubbing unit,
   recycling purified surplus water from said settling tank to said scrubber unit, and
   regulating the amount of the base mixed into said scrubbing water so that the pH value of the liquid in said settling tank is kept within the range 7–10, preferably within the range 8–9.

2. A method according to claim 1, including the step of mixing a base into said scrubbing water in a separate mixing container, whereto also said purified water is recycled, and regulating the amount of base fed to said mixing container in accordance with pH values measured in said settling tank.

3. A method according to claim 1 or 2, including the step of locating said settling tank directly under said scrubber unit and said heat exchanger, and keeping the scrubbing water level in said tank higher than the bottom of said heat exchanger, thus forming a liquid seal at the bottom of the heat exchanger.

4. A method according to claim 1 or 2, including the step of leading said combustion products through a second heat exchanger for recovering heat energy and leading condensation water produced in said second heat exchanger to said settling tank for renewed use in the combustion product treatment process.

5. A method according to claim 1, in which the scrubbing water is introduced in the form of a finely divided mist.

6. An improved apparatus for treating and scrubbing gaseous combustion products from a fuel burning unit, which apparatus comprises a heat exchanger for pre-heating combustion air, a scrubber unit using scrubbing water and a mixing container for adding a base to said scrubbing water, said scrubber unit being provided with feed nozzles for scrubbing water coming from said mixing container, said nozzles being arranged to bring said scrubbing water into contact with the combustion products in the form of a finely divided mist, the improvement consisting in arranging means for measuring the pH value in a bottom receptacle located below said heat exchanger and arranged to collect said scrubbing water and condensation water separated from said combustion products, said bottom receptacle being positioned adjacent to said heat exchanger, and arranging said measuring means as close as possible to said scrubber unit to measure the pH value as close as possible to said scrubber unit for governing the preparation of new scrubbing water in said mixing container to which said used scrubbing water is led from said bottom receptacle.

7. An apparatus combining a fuel burning unit and a plant for treating and scrubbing gaseous combustion products from said burning unit, said apparatus comprising a scrubber unit using scrubbing water and a mixing container for adding a base to said scrubbing water, said scrubber unit being provided with feed nozzles for scrubbing water coming from said mixing container, said nozzles being arranged to bring said scrubbing water into contact with the combustion products in the form of a finely divided mist, said apparatus including a heat exchanger for pre-heating the combustion air of said burning unit by means of the combustion products produced by said burning unit, and a bottom receptacle located adjacent to and below said heat exchanger for collecting used scrubbing water and condensation water separated in said heat exchanger and for separating solid impurities therefrom by means of settling and means to measure the pH value in said bottom receptacle of said used scrubbing water as close as possible to said scrubber unit, which water, after said operations, is arranged to be led directly to said mixing container for repeated use with the amount of said base added being based on the pH measured by said measuring means.

8. An apparatus according to claim 7, comprising a second heat exchanger by means of which heat energy is recovered from the scrubbed combustion products, and means for leading condensation water produced by this process to said bottom receptacle for being reused in the treatment process.

9. An apparatus according to claim 7, in which said bottom receptacle is located below said heat exchanger having a plurality of spaced-apart partition plates, the level of the scrubbing water received in said bottom receptacle being arranged to be kept above the level of the bottom edge of said heat exchanger plates, thus forming a liquid seal at the bottom of said heat exchanger.

10. An apparatus according to claim 8, 9, 6 or 7, in which said bottom receptacle includes means for feeding at intervals the settled solid material out from said bottom receptacle.

11. An apparatus according to claim 8, 9, 6 or 7, including means connected with said mixing container for feeding thereto said base as well as additional water required in the process, and a control unit for regulating the amount of said base added to said mixing container.

* * * * *

UNITED STATES PATENT AND TRADEMARK OFFICE
CERTIFICATE OF CORRECTION

PATENT NO. : 4,323,371
DATED : April 6, 1982
INVENTOR(S) : Tapio Ritvanen

It is certified that error appears in the above—identified patent and that said Letters Patent is hereby corrected as shown below:

Col. 1, line 52; Col. 2, line 13, change "obtain" to --obtained--.

Col. 3, lines 9 to 15 change to read:

--In Figure 1, the arrows associated with tube 11 show the flow path of the combustion products, the arrows associated with tube 12 show the flow path of cooling air of the scrubber unit, that is, also the flow path of the combustion air of burner 1. The arrows associated with tube 13 show the scrubbing water circulation, the arrows associated with tube 19 the flow path of the condensation water and the arrows associated with tube 15 the base feeding.

The Title Page showing the illustrative figure should be deleted to appear as per attached title page.
Sheet 1 of 4 should appear as shown on the attached sheet.

Signed and Sealed this

Twenty-third Day of August 1983

[SEAL]

Attest:

GERALD J. MOSSINGHOFF

Attesting Officer   Commissioner of Patents and Trademarks

United States Patent [19]
Ritvanen

[11] 4,323,371
[45] Apr. 6, 1982

[54] METHOD AND ARRANGEMENT FOR TREATING GASEOUS COMBUSTION PRODUCTS

[75] Inventor: Tapio Ritvanen, Turku, Finland
[73] Assignee: Oy Wartsila Ab, Helsinki, Finland
[21] Appl. No.: 158,300
[22] Filed: Jun. 10, 1980

[30] Foreign Application Priority Data
Jun. 15, 1979 [FI] Finland .................... 791914

[51] Int. Cl.$^3$ .................................... B01D 53/14
[52] U.S. Cl. ............................. 55/19; 55/73; 55/222; 55/227; 55/228; 422/111; 422/173; 423/242
[58] Field of Search ............ 55/19, 73, 85, 89, 222, 55/227, 228, 257 R; 423/212, 242 R, 242 A; 422/111, 168, 173

[56] References Cited

U.S. PATENT DOCUMENTS

| | | | |
|---|---|---|---|
| 3,533,748 | 10/1970 | Finfer et al. | 423/242 X |
| 3,607,001 | 9/1971 | Finfer et al. | 423/242 A |
| 3,897,540 | 7/1975 | Onnen | 423/242 A |
| 3,907,526 | 9/1975 | Saleem et al. | 55/73 X |
| 4,147,756 | 4/1979 | Dahlstrom et al. | 55/73 X |
| 4,208,383 | 6/1980 | Kisters et al. | 423/242 X |
| 4,213,946 | 7/1980 | Furuta et al. | 423/242 |

Primary Examiner—Robert H. Spitzer
Attorney, Agent, or Firm—McAulay, Fields, Fisher, Goldstein & Nissen

[57] ABSTRACT

A method for treating gaseous combustion products, in particular, combustion products containing sulphur dioxide and smoke gases. The combustion products are led to a scrubber in which they are brought into contact with scrubbing water, into which a base, preferably calcium hydroxide, has been added for obtaining suitable neutralization of the acids created in the scrubber. The scrubbing water is sprayed into the gaseous combustion products, preferably in the form of a finely divided mist, and after the scrubbing operation the combustion products are led through a heat exchanger for cooling and for recovery of condensation water. The scrubbing water used and the condensation water are collected in a settling tank, at the bottom of which solid impurities are caused to settle for removal at suitable intervals. The purified surplus water is led from the settling tank and is reintroduced into the scrubber. The amount of base mixed into the scrubbing water for converting the acids created in the scrubber into settling salts, is so chosen, that the pH value of the liquid in the settling tank is 7-10, preferably 8-9.

11 Claims, 4 Drawing Figures